United States Patent
Hoover

(10) Patent No.: US 6,534,571 B1
(45) Date of Patent: Mar. 18, 2003

(54) DESICCANT DISPERSION FOR RUBBER COMPOUNDS

(75) Inventor: James W. Hoover, North Canton, OH (US)

(73) Assignee: Flow Polymers, Inc., Cleveland, OH (US)

( * ) Notice: Subject to any disclaimer, the term of this patent is extended or adjusted under 35 U.S.C. 154(b) by 0 days.

(21) Appl. No.: 09/842,300

(22) Filed: Apr. 25, 2001

(51) Int. Cl.⁷ ............................................... C08L 95/00
(52) U.S. Cl. ......................................... 524/59; 524/433
(58) Field of Search .................................. 524/59, 433

(56) References Cited

U.S. PATENT DOCUMENTS

| | | |
|---|---|---|
| 4,048,128 A | 9/1977 | Eastman |
| 4,108,779 A * | 8/1978 | Carney ........................ 252/8.5 |
| 4,272,212 A | 6/1981 | Bauer, Jr. et al. |
| 4,364,773 A | 12/1982 | Veronneau et al. |
| 4,610,922 A | 9/1986 | Kumasaka et al. |
| 4,826,627 A | 5/1989 | Najjar |
| 4,997,486 A | 3/1991 | Bolsing |
| 5,115,001 A | 5/1992 | Beckmann |
| 5,234,485 A * | 8/1993 | Bolsing ........................ 71/27 |
| 5,348,994 A | 9/1994 | Gorbaty et al. |
| 5,650,454 A | 7/1997 | Hoover et al. |
| 5,665,447 A | 9/1997 | Greaves et al. |
| 5,840,801 A | 11/1998 | Gardiner |
| 6,046,260 A | 4/2000 | Hoover |
| 6,136,897 A | 10/2000 | Kaufman |

FOREIGN PATENT DOCUMENTS

JP 57 139133 A 8/1982

* cited by examiner

*Primary Examiner*—Edward J. Cain
(74) *Attorney, Agent, or Firm*—Pearne & Gordon LLP

(57) ABSTRACT

A solid calcium oxide desiccant dispersion for use in rubber compounds. The dispersion comprises 30–94 weight percent calcium oxide and 3–55 weight percent asphalt and optionally 0.5–12 weight percent fatty acid agent and 0.5–14 weight percent plasticizer. The dispersion is added to rubber compounds at the rate of 1–20 parts per hundred parts rubber.

24 Claims, No Drawings

DESICCANT DISPERSION FOR RUBBER COMPOUNDS

FIELD OF THE INVENTION

The present invention relates to a desiccant dispersion, and more particularly to a calcium oxide desiccant dispersion for removing moisture from rubber compound formulations during processing.

BACKGROUND OF THE INVENTION

It is well known that the presence of moisture in a rubber compound formulation during the vulcanization process can cause serious deleterious effects in the finished rubber product. At normal vulcanizing temperatures, excessive moisture will "gas-out," causing surface anomalies such as blistering or voids on the cured rubber product. In addition to being unaesthetic, such surface anomalies invariably reduce the service life of functional rubber products, e.g. tires and extruded rubber products.

Calcium oxide has long been employed in the art as a desiccant to remove excessive moisture from rubber compounds. Though a very effective desiccant for rubber formulations, the extreme hydrophilicity of calcium oxide makes proper handling and storage prior to use extremely difficult. If not properly stored, calcium oxide readily absorbs ambient atmospheric moisture in a reaction yielding calcium hydroxide, thus greatly depleting its effectiveness as a desiccant.

A second problem associated with calcium oxide is that it is typically delivered to the rubber processing industry as a fine powder. Fine, dry powders tend to increase mixing times and formulation viscosities, and are easily airborne. Calcium oxide is extremely caustic to the skin, eyes, and mucous membranes of humans, and therefore creates a hazardous work environment when airborne.

A known calcium oxide dispersion for use in rubber compound processing is Desical-P from Harwick, which is calcium oxide powder dispersed in naphthenic oil. Such paste dispersion has been fairly successful at improving rubber processing properties, such as homogeneity of calcium oxide throughout the rubber formulation, as well as reducing atmospheric moisture absorption during storage. However, a major detriment to such existing paste formulations is that they tend to sweat or exude oil to the surface when stored over time. Such exuded oil makes handling and weighing of the paste quite difficult. In addition, such pastes are provided in bulk form, and must be cut to proper weight before they are added to a rubber compound batch for processing. Such characteristics contribute additional man-hours to rubber processing which translate directly into additional expense. Lastly, though such calcium oxide paste absorbs moisture at a lower rate than calcium oxide powder, such paste still absorbs significant atmospheric moisture when stored.

Consequently, there is a need in the art for a calcium oxide dispersion that is effective as a rubber compound desiccant, yet does not exude oil when stored, has improved desiccant properties over existing dispersions, is easy to handle and cut to weight, and further resists atmospheric moisture absorption during storage.

SUMMARY OF THE INVENTION

A desiccant dispersion for use in rubber compounds comprising 30–94 wt. % calcium oxide and 3–55 wt. % asphalt. A solid desiccant dispersion comprising 30–94 wt. % calcium oxide, 3–55 wt. % light-colored hydrocarbon resin, 0.5–14 wt. % plasticizer, and 0.5–12 wt. % fatty acid agent. A method of making a vulcanized rubber product comprising the steps of a) incorporating a desiccant dispersion into a rubber compound at a rate of 1–20 parts desiccant dispersion per 100 parts of rubber, said desiccant dispersion comprising 30–94 wt. % calcium oxide and 3–55 wt. % asphalt, said rubber compound comprising rubber selected from the group consisting of natural rubbers, synthetic rubbers, and mixtures thereof; and b) vulcanizing the rubber compound to yield the vulcanized rubber product. A rubber compound comprising rubber and the desiccant dispersion is also provided.

DETAILED DESCRIPTION OF THE PREFERRED EMBODIMENTS OF THE INVENTION

In the description that follows, when a preferred range, such as 5 to 25 (or 5–25), is given, this means preferably at least 5 and, separately and independently, preferably not more than 25. Unless specifically otherwise indicated, all parts are parts by weight and all percents are weight percents, both herein and in the appended claims.

The invented desiccant dispersion has the preferred formulations shown in Table 1. In this formulation or table of components, any preferred or less preferred weight percent or weight percent range of any component can be combined with any preferred or less preferred weight percent or weight percent range of any of the other components; it is not required or necessary that all or any of the weight percents or weight percent ranges come from the same column. The invented calcium oxide desiccant dispersion is in solid form and comprises calcium oxide and asphalt according to a first preferred embodiment of the invention. Preferably, the invented dispersion further comprises fatty acid and plasticizer.

TABLE 1

Preferred composition of invented calcium oxide desiccant dispersion (Listed in weight percents)

| Component | Most Preferred | Less Preferred | Still Less Preferred | Still Less Preferred |
|---|---|---|---|---|
| Asphalt | 15 | 10-20 | 5-30 | 4-40 |
|  |  | 8-25 |  | 3-55 |
| Fatty Acid Agent | 2 | 1.5-4 | 1-7 | 0.5-10 |
|  |  |  |  | 0-12 |
| Plasticizer | 3 | 2-5 | 1.5-7 | 0.5-12 |
|  |  |  |  | 0-14 |
| Calcium Oxide | 80 | 75-85 | 60-90 | 30-94 |
|  |  | 70-88 | 45-92 |  |

Less preferably, the formulation contains 80 weight percent calcium oxide and 20 weight percent asphalt. The asphalt component in the invented dispersion is preferably a blend of 55, less preferably 50–60, less preferably 45–65, less preferably 40–70, less preferably 35–75, percent asphalt (unoxidized asphalt), and 45, less preferably 40–50, less preferably 35–55, less preferably 30–60, less preferably 25–70, percent oxidized (or blown) asphalt. Less preferably the asphalt component can be 100% oxidized or 100% unoxidized asphalt. The asphalt component preferably has a ring and ball softening point of 65–130, more preferably 69–110, more preferably 72–100, more preferably 75–90, more preferably 77–82, °C. The unoxidized asphalt is preferably a product sold by Sun Refining under the name MONOR. Oxidized asphalt, also known as blown asphalt, is asphalt and is produced by blowing air through asphalt at 400–600° F. followed by cooling. Raising the proportion of oxidized asphalt will raise the softening point of the finished dispersion product.

The fatty acid agent, which is optional, is fatty acids, fatty acid esters, or a mixture thereof. Most preferably, the fatty acid agent is stearic acid because of its compatibility with the majority of rubber compounding formulations, as well as its lubricity. The stearic acid preferably has an acid value in the range of 193–212, and a maximum iodine value of 10. Less preferably, the fatty acid agent is oleic, palmitic, linoleic, or linolenic acid, or a mixture thereof. The fatty acid ester is preferably a triglyceride such as a hydrogenated triglyceride, such as Neustrene 060 from Humko Chemical Company. Other examples of suitable fatty acid esters include Promix 200FE from Flow Polymers, and WB212 from Struktol Corporation. The fatty acid agent is preferably uncrosslinked, and provides lubricity to the dispersion which aids mixing and subsequent extrusion. The fatty acid agent further aids wetting out of the calcium oxide powder, which aids incorporation of calcium oxide powder into a rubber compound by reducing the friction coefficient between the powder and the rubber compound.

The plasticizer component, which is optional, is any known rubber processing oil, wax or softening agent compatible with hydrocarbon dispersions. Preferred plasticizers are paraffinic oil (such as Sunpar 2280 from Sun Refining or Stanlube from Harwick Chemical Company), naphthenic oil (such as Calsol from Calumet Lubricants), aromatic oil (such as Sundex from Sun Refining), pine tar (such as Tartac from CP Hall), paraffin wax (such as 130WAX from Akrochem), or polyethylene wax (such as PE 617A from Allied Signal). Less preferably, the plasticizer component may be another softening agent such as Ricon liquid polybutadiene rubber available from Ricon Grand Junction Company, or a mixture of the above. The amount of plasticizer can be increased or decreased to decrease or increase the softening point (or paste point) of the dispersion. A lower softening or paste point will be useful to accommodate rubber compounds having low processing temperatures. Preferably the dispersion is compatible with the processing temperatures of the vast majority of rubber compounds (having discharge temperatures in the range of 180–210° F.). The plasticizer also aids wetting out the calcium oxide powder.

The calcium oxide component is calcium oxide powder as known in the rubber compounding art, which typically has a nominal particle size of about 325 mesh and a specific gravity of about 3.3. Preferably, the calcium oxide powder is between 90–99% pure calcium oxide with the remainder being trace elements or materials and inert matter.

The above formulation yields a dark colored finished product that may discolor or stain white or other light-colored rubber compounds. Where color retention of light-colored rubber compounds is important, a light-colored hydrocarbon resin is substituted for the asphalt in the above formulation according to a second preferred embodiment of the invention. When substituted for asphalt, the light-colored resin is present in the desiccant dispersion formulation in the same preferred proportions as stated for the asphalt component in table 1. The light-colored resin can be any solid, light-colored resin based on hydrocarbon chemistry that has a softening point in the range of 65–130° C. (149–266° F.), more preferably 95–100° C. (203–212° F.). Acceptable resins include, for example, Nevtac from Neville Chemical Company, Petrorez from Akrochem, and Norsolene from Sartomer Corporation. Preferably the light-colored resin is at least as light as at least one of these three resins. Less preferably, the light-colored resin may be terpene tackifiers or a phenolic resin such as SP1068 available from Schenectady International.

The components of the dispersion are preferably mixed as follows. At the preferred parts by weight (80 parts calcium oxide, 15 parts asphalt, 2 parts fatty acid agent, 3 parts plasticizer), all four components are charged into a heated mixer and blended together at 250° F. until the mixture becomes a homogeneous malleable paste. Once fully mixed, the hot paste is removed from the mixer and undergoes a forming stage. Preferably, the paste is delivered to an extruder where it is extruded into small pellets, preferably having a mean diameter of at least 0.1 inch and less than 1, more preferably 0.8, more preferably 0.5, more preferably 0.25, inches, and an average length preferably at least 0.1 inch and preferably less than 1, more preferably 0.8, more preferably 0.6, more preferably 0.5, more preferably 0.4, inches. Optionally, the hot paste can be delivered to some other forming apparatus capable of forming the hot paste into discrete particles such as pellets, rods, flakes, or some other desired shape that will facilitate easy introduction into a rubber compound formulation and uniform dispersion therethrough. Regardless of the particular type of forming apparatus chosen, the whole process (mixing, heating, forming) is preferably a continuous system. One such system is a twin screw mixing extruder, though other systems and configurations are possible, and are known in the mixing art.

The invented dispersion according to the first preferred embodiment (utilizing asphalt) typically is discharged as a dark brown, hard rod or pellet with a softening point of 90–190, more preferably 100–180, more preferably 110–170, more preferably 120–160, more preferably 130–155, more preferably 135–150, more preferably about 145, ° F. The invented dispersion also has a specific gravity of preferably 1.7–2.8, more preferably 1.9–2.4, more preferably about 2.15 in its final solid (extruded) form. The invented dispersion according to the second preferred embodiment (utilizing light-colored hydrocarbon resin) is an off-white, hard rod or pellet with the same preferred physical attributes as stated above.

The invented dispersion is superior to existing calcium oxide pastes because it exists in solid form at ambient conditions, does not exude oil or other slippery residue to its surface, and does not need to be manually cut to weight as is required of existing paste dispersions. Pellets of the invented dispersion are preferably measured out by volume to obtain the desired weight via calculation using its known bulk density.

Optionally, ethylene-vinyl acetate (EVA) or other similar thermoplastic material can be added to the invented dispersion formulation prior to mixing in order to enhance pelletizing or other shape forming during, for example, extrusion. Preferably, such a thermoplastic will have a melting point in the range of 350–400° F., and is added to the invented dispersion as follows:

1. For the asphalt-containing formulation, at 3–5 parts EVA (or other thermoplastic) per 100 parts asphalt.

2. For the resin-containing formulation, at 10–15 parts EVA (or other thermoplastic) per 75 parts resin.

The invented dispersion is added to rubber compounds (comprising rubber selected from the group consisting of natural rubbers, synthetic rubbers and mixtures thereof) prior to vulcanization in the same manner as other known desiccant dispersions are added to rubber compounds comprising natural rubbers, synthetic rubbers and mixtures thereof. The invented dispersion is most preferably used with ethylene-propylene-diene (EPDM), polychloroprene (CR), styrene-butadiene (SBR), ethylene (EPR), nitrile (NBR), bromobutyl, and halobutyl (IIR) rubber compounds. Less preferably, the invented dispersion is used with epichlorohydrin (ECO), silicone, acrylic, isoprene-acrylonitrile, polynorborene, polyisoprene, and styrene-isoprene rubber compounds.

Rubber compounds utilizing the invented dispersion, particularly EPDM compounds, find particular utility for vulcanized rubber products such as tires, tire treads, carcasses, sidewalls, coating stocks, hoses, belting, inner tubes, innerliners, general purpose rubbers, and other uses. Such rubber compounds also find particular utility as extruded goods such as seals, foams, tubes, and a variety of automotive components. A rubber compound utilizing the invented dispersion may include accelerators, retarders, activators, vulcanizers, antioxidants, antiozonants, protective materials, other plasticizers, processing aids, stabilizers, tackifiers, extenders, fillers, reinforcing materials, blowing agents, lubricants, and other rubber compounding materials known in the art.

The invented dispersion is preferably added to a rubber compound formulation during the final productive stage of the mixing cycle at a rate of 1–20, preferably 2–18, preferably 4–15, preferably 6–12, preferably about 7–10, phr (parts per hundred parts of rubber). The rubber compound is then vulcanized as known in the art to produce a vulcanized rubber product.

The following Examples further illustrate various aspects of the invention.

EXAMPLE 1

An invented formulation containing 9.75 weight percent unoxidized asphalt, 4.8 weight percent oxidized asphalt, 2 weight percent stearic acid, 3 weight percent Sunpar 2280 paraffinic oil, 80 weight percent calcium oxide powder and 0.45 weight percent EVA was tested against a common calcium oxide dispersion paste sold by Harwick as Desical-P (Desical). It is a soft, malleable paste that must be cut to weight prior to addition to a rubber compound formulation. Desical is 80 weight percent calcium oxide, with the balance being naphthenic oil, and optionally a stiffening agent such as paraffin wax or some other wax like material.

The invented dispersion, and the Desical dispersion were added respectively to separate batches of an EPDM rubber compound formulation during the productive stage of the mixing cycle. Both formulations were mixed using a laboratory Brabender mixer at 65° C. (149° F.) and a rotor speed of 55 rpm. First, identical master batches of EPDM rubber compound were prepared as shown in Table 2.

TABLE 2

| Ingredient | Function | Parts by Weight |
|---|---|---|
| EPDM 6505 | Rubber | 100 |
| N550 Carbon Black | Filler | 155 |
| A-1 Whiting (CaCO$_3$) | Filler | 60 |
| ZnO | Activator | 5 |
| Stearic acid | Activator | 1 |
| Sunpar 2280 (Paraffinic oil) | Plasticizer | 75 |
| Flectol ODP (Octylated diphenylamine) | Antioxidant | 1 |

TABLE 2-continued

| Ingredient | Function | Parts by Weight |
|---|---|---|
| PEG3350 (Polyethylene-glycol wax) | Lubricant | 3 |
| | TOTAL: | 400 |

The master batch described in table 2 was divided into equal halves each having a total of 200 parts by weight. Each half was then combined with a desiccant dispersion (either the invented dispersion or Desical) and an identical cure package comprising accelerators and vulcanizers to make two separate productive batches in the following manner. First the master batch was added to a Brabender mixer at 45° C. (113° F.) with a mixing speed of 55 rpm. Next the appropriate calcium oxide dispersion was combined with the cure package and added to the master batch in the mixer. The mixing speed was held constant and the temperature ramped up to 90° C. (194° F.). At the top of the temperature ramp, the rubber compound batch was discharged and immediately milled on a two-roll laboratory mill. The compositions of each productive batch are listed in table 3 below.

TABLE 3

Productive batch compositions for invented and Desical productive batches (parts by weight)

| Ingredient | Function | Invented Batch | Desical Batch |
|---|---|---|---|
| Master Batch | — | 200 | 200 |
| Sulfur | Vulcanizer | 0.35 | 0.35 |
| 2-mercaptobenzothiazole (MBT) | Accelerator | 0.10 | 0.10 |
| Benzothiazyl disulfide (MBTS) | Accelerator | 0.60 | 0.60 |
| Tetramethylthiuram disulfide (TMTD) | Accelerator | 0.38 | 0.38 |
| Dipentamethylenethiuram hexasulfide (DPTT) | Accelerator | 0.50 | 0.50 |
| Tellurium diethyldithiocarbamate (TDEC) | Accelerator | 0.10 | 0.10 |
| Zinc dibutyldithiocarbamate | Accelerator | 0.38 | 0.38 |
| Invented Calcium Oxide Dispersion | Desiccant | 7.00 | 0.00 |
| Desical-P | Desiccant | 0.00 | 7.00 |
| | TOTAL | 209.41 | 209.41 |

The invented dispersion was in the form of solid extruded pellets, and the appropriate weight was obtained via measuring an appropriate number of extruded pellets. It was observed that the Desical paste exuded a slippery oil to its surface making it difficult to handle and cut to proper weight.

It was observed that both calcium oxide dispersions were readily incorporated into the rubber batch, though the Desical dispersion periodically adhered to the interior wall of the Brabender mixer, and had to be pushed back into the batch during mixing. No such wall-adherence occurred with the invented dispersion pellets. Once cured, the physical and state-of-cure properties of the two finished rubber products were measured in accordance with ASTM methods. Specifically, hardness was measured using ASTM Testing Method # D2240, cured physical properties (tensile strength, %-elongation and %-modulus) using ASTM Testing Method # D412, Die-C Tear using ASTM Testing Method # D624, and Mooney Viscosity and Scorch using ASTM Testing Method # D1646 ODR (Oscillating Disk Rheometer). The results are as shown in Table 4.

TABLE 4

Cured Physical Properties

| Batch | Hardness | (100) %-modulus | Percent Elongation | Tensile (psi) | Tear (C) |
|---|---|---|---|---|---|
| Invented | 78 | 575 | 270% | 1365 | 212 |
| Desical-P | 78 | 565 | 270% | 1365 | 207 |

| | Mooney Viscosity (cP) | Mooney Scorch (min:sec) | | | |
|---|---|---|---|---|---|
| Invented | 68.0 | 10:55 | | | |
| Desical-P | 65.0 | 10:09 | | | |

State of Cure (ODR)

| | Max. Torque (inch-lbs.) | Min. Torque (inch-lbs.) | Ts(1) (min) | Tc(90) (min) |
|---|---|---|---|---|
| Invented | 48.07 | 6.20 | 1.02 | 2.42 |
| Desical-P | 47.44 | 6.00 | 0.98 | 2.31 |

State-of-cure properties for the two rubber compounds were measured using an oscillating disk rheometer (ODR) under the following test conditions: 350° F., 55 rpm, 15-minute motor, 3° arc and 100 range. "Max. Torque" refers to the highest torque value measured by an oscillating disk rheometer during a 15 minute test. "Min. Torque," conversely, was the lowest torque value measured during the test. Ts(1) was the length of time in minutes required for the rubber compound to begin to vulcanize, measured when the torque value rose 2 inch-lbs. from the baseline. Tc(90) was the length of time in minutes required for the rubber compound to become 90% vulcanized.

A Mooney Viscometer was used to measure both compound viscosity and scorch times under the following conditions: Viscosity at ML 1+4 at 212° F.; Scorch at Ms delta 5 at 250° F.

As can be seen from table 4, rubber compounds utilizing the invented desiccant dispersion exhibit essentially identical physical and state-of-cure properties compared with rubber compounds utilizing the currently widely used Desical-P dispersion. The result is that the invented solid dispersion yields a finished rubber part of comparable quality, while being significantly less cumbersome to handle and to weigh.

EXAMPLE 2

Moisture absorption rates, paste points and specific gravity were also measured for the invented desiccant dispersion tested in Example 1 and the Desical dispersion alone. These experiments demonstrated the invented dispersion's superior resistance to atmospheric moisture absorption during storage, permitting it to retain a significantly higher proportion of its water-absorbing capacity during storage than existing paste dispersions.

Moisture absorption values were determined by weighing a specimen of each dispersion on an analytical scale and calculating the percent of weight gain after specified moisture exposure times. Each specimen was exposed to ambient conditions, i.e. 21° C. (69.8° F.) and 40% relative humidity. Percent moisture absorption for each specimen was measured once after 24 hours and again after 48 hours. Paste points were measured by placing a small piece of each calcium oxide dispersion onto a PTC melt point meter and recording the temperature when the specimen became a malleable paste. The resulting physical data for the calcium oxide dispersions is summarized below in table 5.

TABLE 5

| | Physical Properties | | | |
|---|---|---|---|---|
| | Moisture Absorption | | Paste Point | Specific |
| | @ 24 hours | @ 46 hours | (° F.) | Gravity |
| Invented | 0.1314% | 1.0350% | 145 | 2.15 |
| Desical-P | 0.3878% | 2.2581% | 110 | 2.20 |

The two dispersions exhibit nearly identical specific gravity, while the invented dispersion experienced less than half the rate of moisture absorption of the Desical dispersion. In addition, the invented dispersion exhibited a paste point of 145° F. compared with 110° F. for the Desical dispersion, meaning that the invented dispersion remained solid up until it reached the rubber processing temperature when it softened to enable homogeneous mixing throughout a rubber compound. The invented dispersion was thus easier to handle and store than the Desical dispersion.

During the experiment, it was noticed that the Desical had become an off-white part-paste, part-powder material after 24 hours of exposure to ambient moisture. The invented dispersion had begun to turn to a lighter shade of brown, however still remained solid. After 48 hours, the Desical had become a white powder throughout, indicating that a significant amount of moisture had been absorbed. The invented dispersion turned tan in color, and had begun to develop a light powdery film on the surface, however still remained solid. These results indicated that, properly stored, the invented calcium oxide dispersion enjoys a far greater shelf-life than the calcium oxide pastes of the prior art, and retains more than twice the water absorbing capacity.

Although the hereinabove described embodiments of the invention constitute the preferred embodiments, it should be understood that modifications can be made thereto without departing from the scope of the invention as set forth in the appended claims.

What is claimed is:

1. A desiccant dispersion for use in rubber compounds, said desiccant dispersion comprising 30–94 weight percent calcium oxide and 3–55 weight percent asphalt, said desiccant dispersion being in solid form and having a softening point of 90–190° F.

2. A dispersion according to claim 1, said dispersion comprising 70–88 weight percent calcium oxide and 8–30 weight percent asphalt.

3. A dispersion according to claim 1, said desiccant dispersion further comprising 0.5–12 weight percent fatty acid agent, said fatty acid agent being selected from the group consisting of fatty acids, fatty acid esters, and mixtures thereof.

4. A dispersion according to claim 1, said desiccant dispersion further comprising 0.5–14 weight percent plasticizer.

5. A dispersion according to claim 1, said dispersion further comprising 3–5 parts ethylene-vinyl acetate per 100 parts asphalt.

6. A dispersion according to claim 1, said asphalt component being 35–75 weight percent unoxidized asphalt and 25–70 weight percent oxidized asphalt.

7. A dispersion according to claim 1, said dispersion further comprising 0.5–12 weight percent stearic acid.

8. A dispersion according to claim 4, wherein said plasticizer is selected from the group consisting of paraffinic oil, naphthenic oil, aromatic oil, pine tar, paraffin wax, polyethylene wax, liquid polybutadiene rubber, and mixtures thereof.

9. A dispersion according to claim 1, said dispersion further comprising 0.5–12 weight percent fatty acid, and 0.5–14 weight percent plasticizer.

10. A dispersion according to claim 1, wherein said asphalt has a ring and ball softening point of 65–130° C.

11. A solid desiccant dispersion comprising 30–94 weight percent calcium oxide, 3–55 weight percent light-colored hydrocarbon resin, 0.5–14 weight percent plasticizer, and 0.5–12 weight percent fatty acid agent.

12. A method of making a vulcanized rubber product comprising the steps of:
   a) incorporating a desiccant dispersion into a rubber compound at a rate of 1–20 parts desiccant dispersion per hundred parts of rubber, said desiccant dispersion comprising 30–94 weight percent calcium oxide and 3–55 weight percent asphalt, said rubber compound comprising rubber selected from the group consisting of natural rubbers, synthetic rubbers, and mixtures thereof; and
   b) vulcanizing said rubber compound to yield said vulcanized rubber product.

13. A method according to claim 12, said dispersion comprising 70–88 weight percent calcium oxide and 8–30 weight percent asphalt.

14. A method according to claim 12, said dispersion further comprising 0.5–12 weight percent fatty acid agent, said fatty acid agent being selected from the group consisting of fatty acids, fatty acid esters, and mixtures thereof.

15. A method according to claim 12, said dispersion further comprising 0.5–14 weight percent plasticizer.

16. A method according to claim 12, said dispersion having a softening point between 90 and 190° F.

17. A rubber compound comprising (a) rubber selected from the group consisting of natural rubbers, synthetic rubbers, and mixtures thereof, and (b) a desiccant dispersion comprising 30–94 weight percent calcium oxide and 3–55 weight percent asphalt, said desiccant dispersion being present in said rubber compound at a rate of 1 to 20 parts desiccant dispersion per hundred parts rubber.

18. A rubber compound according to claim 17, said desiccant dispersion further comprising 0.5–12 weight percent fatty acid agent, said fatty acid agent being selected from the group consisting of fatty acids, fatty acid esters and mixtures thereof.

19. A rubber compound according to claim 17, said desiccant dispersion further comprising 0.5–14 weight percent plasticizer.

20. A rubber compound according to claim 17, said desiccant dispersion further comprising 3–5 parts ethylene-vinyl acetate per 100 parts asphalt.

21. A rubber compound according to claim 17, said asphalt component being 35–75 weight percent unoxidized asphalt and 25–70 weight percent oxidized asphalt.

22. A rubber compound according to claim 17, said desiccant dispersion further comprising 0.5–12 weight percent stearic acid.

23. A rubber compound according to claim 19, said plasticizer being selected from the group consisting of paraffinic oil, naphthenic oil, aromatic oil, pine tar, paraffin wax, polyethylene wax, liquid polybutadiene rubber, and mixtures thereof.

24. A rubber compound according to claim 17, said desiccant dispersion comprising 70–88 weight percent calcium oxide and 8–30 weight percent asphalt.

* * * * *

UNITED STATES PATENT AND TRADEMARK OFFICE
CERTIFICATE OF CORRECTION

PATENT NO. : 6,534,571 B1
DATED : March 18, 2003
INVENTOR(S) : James W. Hoover

It is certified that error appears in the above-identified patent and that said Letters Patent is hereby corrected as shown below:

<u>Column 8,</u>
Line 11, please delete "@ 46 hours", and insert therefor -- @ 48 hours --.

Signed and Sealed this

Sixteenth Day of December, 2003

JAMES E. ROGAN
*Director of the United States Patent and Trademark Office*